Jan. 12, 1971  A. E. SEED  3,554,026
LOAD CELL
Original Filed Sept. 3, 1965
2 Sheets-Sheet 1
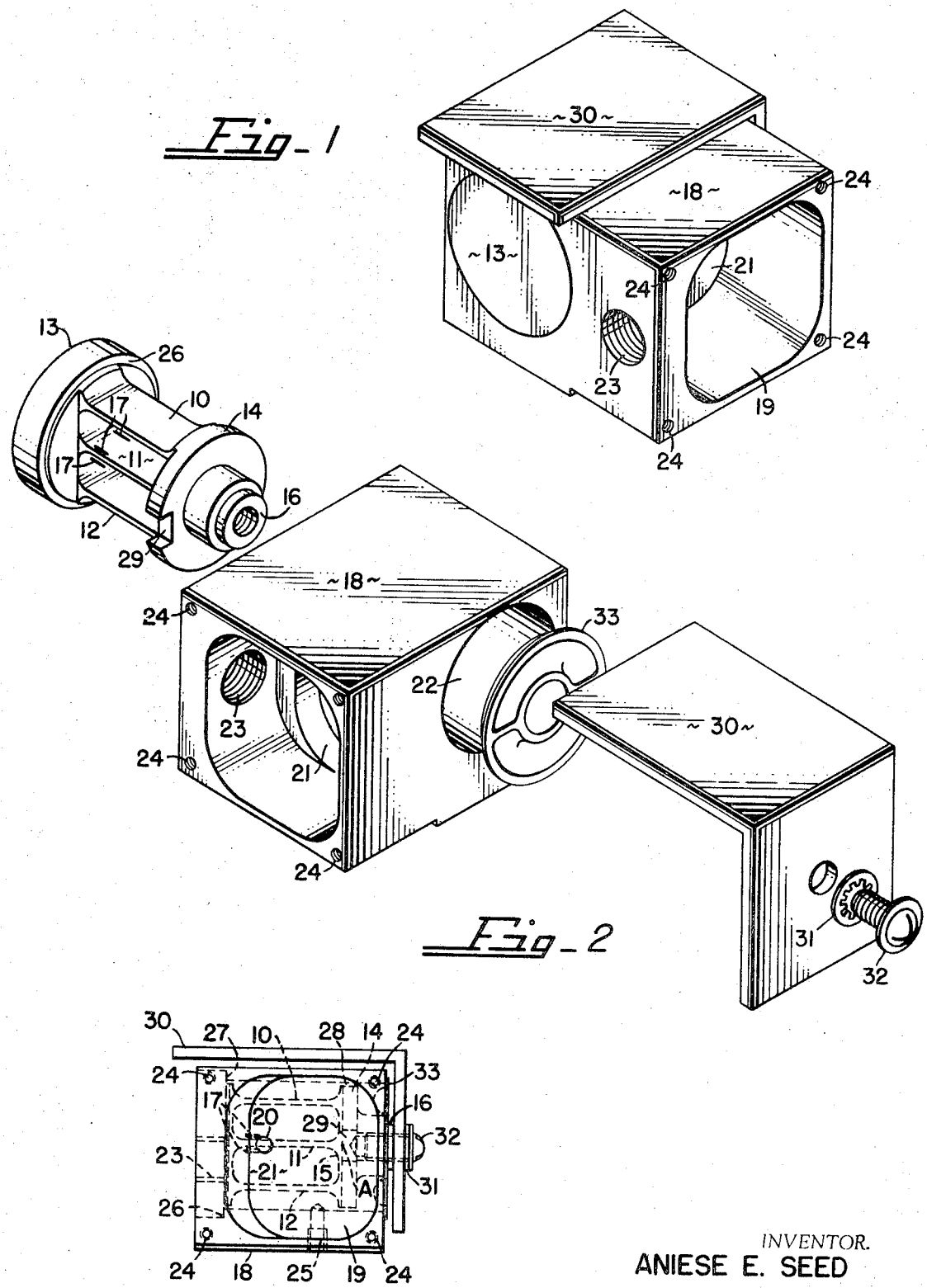
INVENTOR.
ANIESE E. SEED
BY
Thomas H. Grafton
ATTORNEY Jan. 12, 1971  A. E. SEED  3,554,026
LOAD CELL
Original Filed Sept. 3, 1965  2 Sheets-Sheet 2
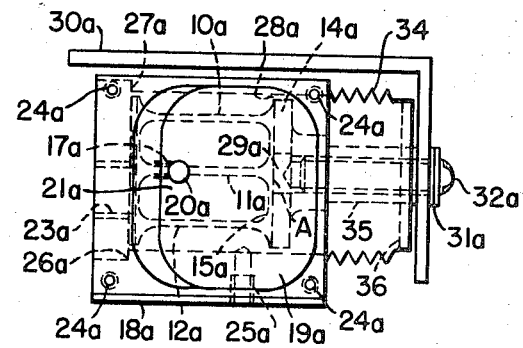
Fig_4
INVENTOR.
ANIESE E. SEED
BY
Thomas H. Grafton
ATTORNEY United States Patent Office 3,554,026
Patented Jan. 12, 1971

3,554,026
LOAD CELL
Aniese E. Seed, Toledo, Ohio, assignor, by mesne assignments, to The Reliance Electric and Engineering Company, Toledo, Ohio, a corporation of Ohio
Continuation of application Ser. No. 726,607, May 3, 1968, which is a continuation of Ser. No. 484,920, Sept. 3, 1965. This application May 22, 1969, Ser. No. 827,077
Int. Cl. G01l 1/22
U.S. Cl. 73—141
4 Claims

ABSTRACT OF THE DISCLOSURE

A load cell comprising, in combination, a bending beam, a base for rigidly supporting one end of the beam while the other beam end is free to move, connecting means having inner and outer portions, single flexible sealing means for hermetically sealing the load cell connected to said connecting means forming a sealed space, said inner and outer connecting means portions having, respectively, an inner side connected to the movable beam end and an outer opposite side outside the sealed space, a load receiver for receiving forces to be measured connected to said outer portion, and load responsive means operatively connected to the beam. This structure results in any resultant force due to variations in air pressure on the sealing means and connecting means being generally perpendicular to forces sensed by the load cell.

---

This is a continuation of abandoned application Ser. No. 726,607, filed May 3, 1968 which in turn was a continuation of abandoned application Ser. No. 484,920, filed Sept. 3, 1965.

This invention relates to force measuring devices and more particularly to a load cell employing load responsive means, such as impedance strain gage means, for determining an applied load in terms of strain induced by the load.

One object of this invention is to provide an improved low capacity load cell (e.g., one to ten pounds).

Another object is to provide a load cell which does not need pressure compensation as shown in U.S. Pat. No. 3,136,157 issued June 9, 1964 to Aniese E. Seed and Frank E. Golding.

Still another object is to provide a load cell having simplified means for sealing it against water and dust.

A further object is to provide a load cell having improved overload stop means operable in all possible loading directions.

Another object is to provide an improved beam type force sensing device which is not affected by off center loading.

Still another object is to provide a beam type force sensing device having superior simplicity.

One embodiment of this invention enabling the realization of these objects is a load cell comprising a housing defining a cavity, three bending beams spaced apart in the general direction of bending of the beams, a base received in the cavity for rigidly supporting one end of each of the beams while the other beam ends are free to move, connecting means having inner and outer opposite sides for rigidly connecting together through the inner side the movable ends of the beams, a load receiver for receiving forces to be measured applied in the direction of bending of the beams rigidly connected to said outer side, and load responsive means mounted on the middle beam at a surface that is subjected to bending stress under the influence of forces applied to the load receiver.

The beams, the base and the connecting means are machined from a single piece of metal. The three beams are identical, the outer two acting like a parallelogram lever system providing the necessary forces to counteract applied torques. The center beam acts on the neutral axis thus being substantially insensitive to applied torques. Strain in the center beam is induced by loads on the load receiver producing load forces which can be broken down into components perpendicular to and parallel to the center beam. Those force components which are parallel to the center beam axis induce equal strains in all of the load responsive means (strain gages) and thus they produce no output. Accordingly, the device for all practical purposes is only sensitive to perpendicular forces. The beams offer a large moment of inertia against side forces and the strain gages are so symmetrically placed on the center beam that they can be wired to provide no output due to side loads.

Since the load cell is insensitive to axial forces, no pressure compensation is needed. The load cell is sealed against water and dust by means of a resilient member connected to the housing and to the connecting means at points contained in one or more planes which are generally perpendicular to the beams. The resultant force due to variations of the air pressure between the inner and outer sides of the sealing means is generally perpendicular to forces sensed by the load cell.

Movement of the beams is limited by engagement of the connecting means with the housing. This provides overload stop in all possible loading directions.

In accordance with the above, one feature of this invention resides in not needing pressure compensation.

Another feature resides in the use of the above resilient means which are simplified for hermetically sealing the load cell.

The above and other objects and features of this invention will be appreciated more fully from the following detailed description when read with reference to the accompanying drawings wherein:

FIG. 1 is an isometric view of the load cell;
FIG. 2 is an exploded view of the load cell;
FIG. 3 is an elevational view of the load cell; and
FIG. 4 is an elevational view, similar to FIG. 3, of a modified load cell.

Referring to the drawings, the spring counterforce part of the load cell includes three bending beams 10, 11 and 12 spaced apart in the direction of bending of the beams and disposed parallel to each other with the outer two beams 10 and 12 being spaced equally from the center beam 11. A base 13 rigidly supports one end of each of the beams 10–12 while the outer beam ends are free to move. Connecting means 14 having inner 15 and outer 16 opposite sides rigidly connects together through the inner side 15 the movable ends of the beams. The beams, base and connecting means are machined from a single piece of metal. The three beams 10–12 are identical to each other, the top and bottom beams 10 and 12 being relatively thin so that they will bend easily but being relatively wide so that they do not stretch significantly. The center beam 11 detects only the translation of point A (FIG. 3) plus any rotataion of point A which is a function of the stretching of the outer beams and the distance between the outer beams, point A being contained in the neutral axis of the center beam. Since the center beam acts on the neutral axis, it is substantially insensitive to applied torques. The outer beams 10 and 12 act like a parallelogram lever system providing the necessary forces to counteract applied torques. Electrical impedance strain gage means, preferably in the form of bonded electrical resistance filament type gages 17, are secured preferably to both the top and bottom surfaces of the center beam 11 (two gages on the top and two gages on the bottom—only three gages shown in FIG. 2). As is well known, the change of electrical resistance of the strain gages in response to a given applied load is measured by any suitable electrical measuring circuit such as a Wheatstone bridge. The strain gages are load responsive means mounted on one of the beams at a surface that is subjected to bending stress under the influence of forces. Any suitable odd number of bending beams in which the outer beams are symmetrical with respect to the axis of the middle beam can be used. Any suitable load responsive means can be used, such as unbonded strain gages, which is operatively connected to the center beam in place of the bonded strain gages.

A housing 18, defining an opening 19 which receives the wires from the strain gages 17 (not shown) that extend through a hole 20 in an inner wall 21 of the housing 18, defines a cavity 22 which receives the beams 10–12, base 13 and connecting means 14. The wires in the opening 19 are connected to the above suitable electrical measuring circuit through wires (not shown) which extend through a hole 23 in the housing 18. A cover (not shown) functions to close the opening 19 forming with the walls of the opening 19 a terminal box, the cover being secured by means of screws received in tapped holes 24. Tapped holes 25 (only one shown) receive screws (not shown) which serve to attach the bottom of the housing 18 to any suitable support or base.

The base 13 has a shoulder 26 which, when the integrally formed base 13, beams 10–12, and connecting means 14 are assembled in the housing 18, seats on an abutment 27 in the housing cavity 22, the base 13 being received in a press fit and then being soldered around its outer edge to seal one end of the housing cavity 22. The circumference of the connecting means 14 is less than that of the base 13 to provide a gap 28. Movement of the beams 10–12 is limited by engagement of the connecting means 14 with the housing 18 whenever the gap 28 is closed. This provides overload stop means operable in all possible loading directions. A slot 29 in the connecting means 14 provides clearance for the wires connected to the strain gages 17 during assembly. After assembly, the slot 29 has no function.

The connecting means 14 also functions to connect a load receiver 30 to the beams 10–12, the load receiver 30 being in the form of a recumbent L having one leg rigidly connected by means of a washer 31 and a screw 32 to the outer side 16 of the connecting means 14 and the other leg arranged as a load platter for receiving forces to be measured. The load receiver 30 can be positioned in board as shown or it can be reversed to be positioned out board or it can be rotated 180 degrees to be below the rest of the load cell. The middle beam 11 defines a longitudinally extending neutral axis and the load receiver 30 is connected to the outer side 16 of the connecting means 14 at the neutral axis for the sake of symmetry. However, it is not necessary that the load receiver 30 be connected at the neutral axis. It has been found that a given load can be put on any point on the load receiver 30 without changing the load cell output due to the parallelogram lever system, i.e., the load cell is not affected by off center loading because the upper and lower beams take up the torque.

One of the features of the load cell resides in its not needing pressure compensation as shown in the above U.S. Pat. No. 3,136,157. The reason for this is that the load cell is insensitive to axial forces. Bending the center beam 11 up or down under load forces to be measured unbalances the measuring circuit (e.g., Wheatstone bridge) in the usual way. However, axial forces do not unbalance the bridge, e.g., pressure directed inwardly on the vertical leg of the L-shaped load receiver 30 puts all four strain gages under compression equally. Hence the load cell insofar as it has been described is operable.

However, where water or dust is a problem sealing means for closing the cavity 22 must be provided.

The sealing means consists of a resilient flexible diaphragm 33 secured to the housing 18 and embracing the outer side 16 of the connecting means 14 which is round and extends through the diaphragm 33 to the exterior for attachment to the load receiver 30. The diaphragm 33 is semi-circular in shape as seen in FIG. 3 so that it maintains its shape and spring rate with variations in external or internal air pressure due to temperature changes. A bellows can be used in place of the diaphragm 33 where pressure changes are not large enough to make spring rate changes significant. A thin flat rubber or the like sheet also can be used in place of the diaphragm 33, the sheet being cemented to the housing 18 and connecting means 14. The resultant force due to variations of the air pressure between the inner and outer sides of the diaphragm 33 is generally perpendicular to forces sensed by the load cell. The diphragm 33 is connected to the housing 18 and to the connecting means 14 at points contained in a plane which is generally parallel to the forces sensed by the load cell. This in contrast to the diaphragms shown in the above U.S. Pat. No. 3,136,157 in which both pressure compensating diaphragms are perpendicular to forces sensed by the cell. However, it is not necessary that the points of connection to the housing and the points of connection to the connecting means 14 lay in the same plane. In all cases, however, the resilient sealing means for closing the cavity is connected to the housing and to the connecting means at points contained in one or more planes which are generally parallel to the forces sensed by the load cell.

FIG. 4 shows a bellows 34 used in place of the diaphragm 33 as described above. Similar reference numbers in FIGS. 3 and 4 refer to parts alike in structure and in function. The bellows 34 is connected to the housing 18 at points contained in a plane which is generally parallel to the forces sensed by the cell in the same manner as the diaphragm is connected to the housing. The bellows 34 also is connected to an extension 35 of the connecting means 14 through a solid circular member 36 fixed to such extension at points in a plane which is generally parallel to the forces sensed by the load cell. Any resultant force due to variations in air pressure on the bellows 34 and connecting means 14 is generally perpendicular to forces sensed by the load cell.

It is to be understood that the above description is illustrative of this invention and that various modifications thereof can be utilized without departing from its spirit and scope.

Having described the invention, I claim:

1. A load cell comprising, in combination, three bending beams, a base for rigidly supporting one end of each of the beams while the outer beam ends are free to move, said beams being disposed substantially parallel to each other and the outer two beams being each spaced about equally from the middle beam, means having inner and outer opposite sides for rigidly connecting together through the inner side the movable ends of the beams, a load receiver for receiving forces to be measured rigidly connected to said outer side, and load responsive means mounted on the middle beam at a surface that is subjected to bending stress under the influence of forces applied to the load receiver, the middle beam defining a longitudinally extending neutral axis and the load receiver being connected to said outer side at said neutral axis.

2. A load cell comprising, in combination, a housing defining a cavity, a plurality of bending beams, a base received in the cavity for rigidly supporting one end of each of the beams while the other beam ends are free to move, said beams being disposed substantially parallel to each other, connecting means having inner and outer opposite sides for rigidly connecting together through the inner side the movable ends of the beams, a load receiver for receiving forces to be measured rigidly connected to said outer side, and load responsive means mounted on one of the beams at a surface that is subjected to bending stress under the influence of forces applied to the load receiver, the beam which carries the load responsive means defining a neutral axis and the load receiver being connected to said outer side at the neutral axis.

3. A load cell comprising, in combination, at least two bending beams forming two opposite sides of a parallelogram, base means and connecting means forming the other two opposite sides of said parallelogram, said base means rigidly supporting one end of each of the beams, said connecting means having inner and outer opposite sides spaced axially of the beams, said inner side interconnecting the other ends of said beams, single flexible sealing means for hermetically sealing the load cell connected to the base means and to the connecting means, the base means, the connecting means and the sealing means forming a sealed space, a load receiver for receiving forces to be measured, said load receiver being connected to said connecting means outside the sealed space, and load responsive means within the sealed space operatively connected to at least one of the beams.

4. A load cell according to claim 3 wherein the sealing means is connected to the connecting means in a plane which is generally perpendicular to the axes of the beams.

References Cited

UNITED STATES PATENTS 2,329,541  9/1943  Kuehni.
3,180,139  4/1965  Soderholm.
3,260,106  7/1966  Hull et al.

CHARLES A. RUEHL, Primary Examiner

U.S. Cl. X.R.

177—211